(12) United States Patent  
Stevenson

(10) Patent No.: US 6,554,340 B1
(45) Date of Patent: Apr. 29, 2003

(54) BED COVER AND EXTENDER UNIT FOR VEHICLES

(75) Inventor: Robin Stevenson, Bloomfield, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/104,278

(22) Filed: Mar. 22, 2002

(51) Int. Cl.⁷ .................................................. B60R 9/06
(52) U.S. Cl. ............... 296/26.11; 296/37.6; 296/100.06; 296/100.02
(58) Field of Search ........................... 296/26.11, 26.08, 296/100.01, 100.02, 100.04, 100.06, 37.6, 37.14, 37.16, 76

(56) References Cited

U.S. PATENT DOCUMENTS

| 1,249,793 | A | * | 12/1917 | McCauley | 296/26.11 |
|---|---|---|---|---|---|
| 1,266,521 | A | * | 5/1918 | Norquist | 296/26.11 |
| 1,272,620 | A | * | 7/1918 | Carlson | 296/26.11 |
| 1,289,997 | A | * | 12/1918 | Wyeth | 296/26.11 |
| 1,446,833 | A | * | 2/1923 | Carlson | 296/26.11 X |
| 1,454,784 | A | * | 5/1923 | Gilmore | 296/26.11 |
| 1,655,797 | A | * | 1/1928 | Peck | 296/26.11 X |
| 1,919,063 | A | * | 7/1933 | Hubbard | 296/26.11 |
| 2,552,898 | A | * | 5/1951 | Lenci et al. | 296/76 X |
| 2,626,179 | A | * | 1/1953 | Gonzalez | 296/76 X |
| 5,087,091 | A | * | 2/1992 | Madill | 296/26.11 |
| 5,154,470 | A | * | 10/1992 | Bringman, Jr. | 296/180.1 |
| 5,700,047 | A |   | 12/1997 | Leitner et al. | 296/26.11 |
| 6,217,103 | B1 |  | 4/2001 | Schultz et al. | 296/100.09 |
| 6,283,525 | B1 |  | 9/2001 | Morse | 296/26.02 |

FOREIGN PATENT DOCUMENTS

| FR | 1569936 | * | 6/1969 | 296/76 |
|---|---|---|---|---|
| SU | 867757 | * | 9/1981 | 296/26.11 |

* cited by examiner

*Primary Examiner*—D. Glenn Dayoan  
*Assistant Examiner*—Patricia Engle  
(74) *Attorney, Agent, or Firm*—Kathryn A. Marra

(57) ABSTRACT

A cover and extender unit for the bed of a truck bounded by a forward wall, opposing side walls and a rear tailgate mounted for movement between fixed upright and horizontal positions comprising a pivoting frame stowed in the bed having laterally spaced sides, a transversely extending gating panel, and a rigid top cover roofing the bed; the top cover is hinged at forward points to the sides so it can be turned upwardly from the aft end of the bed for bed access, side pivot construction connects the frame to the side walls of the bed near the aft end thereof allowing the unit to be turned 180 degrees rearward from the stowed and bed cover position to a horizontal position thereby to extend the bed beyond the extremity of the lowered tailgate with the cover now serving as the bed extension and the forward gating panel as a rear tailgate.

10 Claims, 5 Drawing Sheets

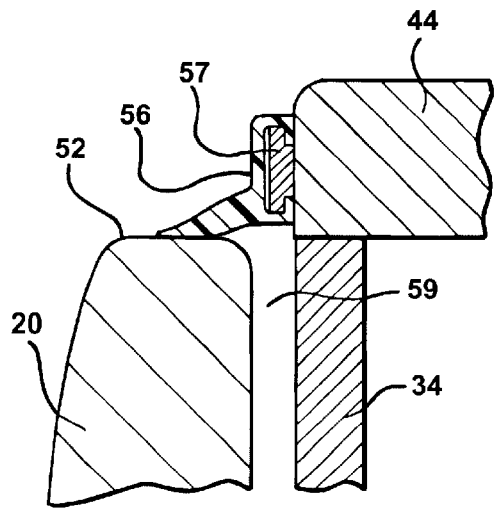
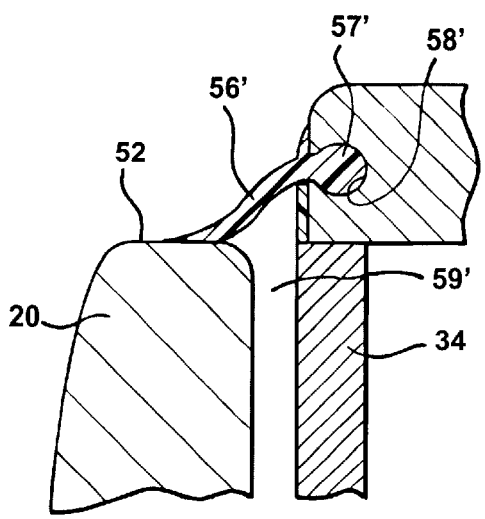
FIG - 1B     FIG - 1C
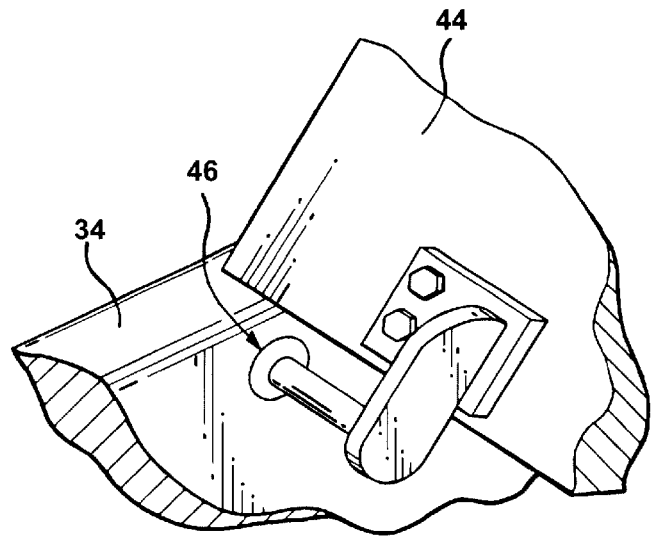
FIG - 1D
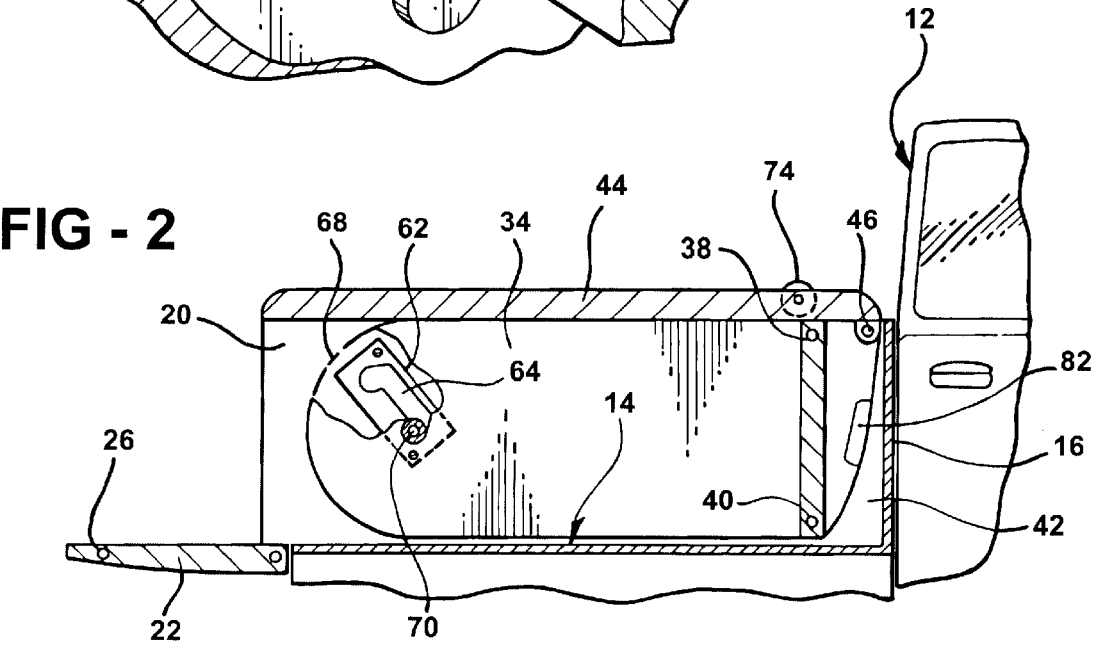
FIG - 2

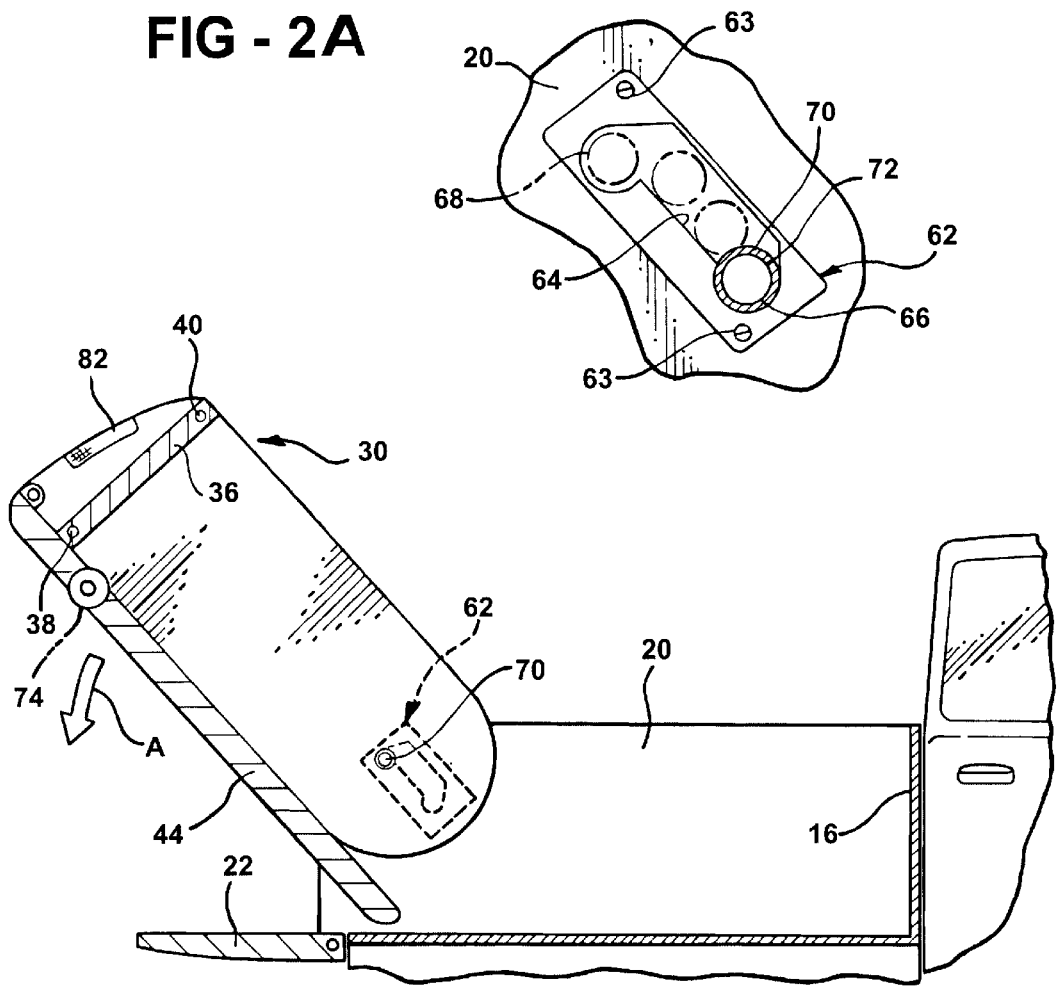
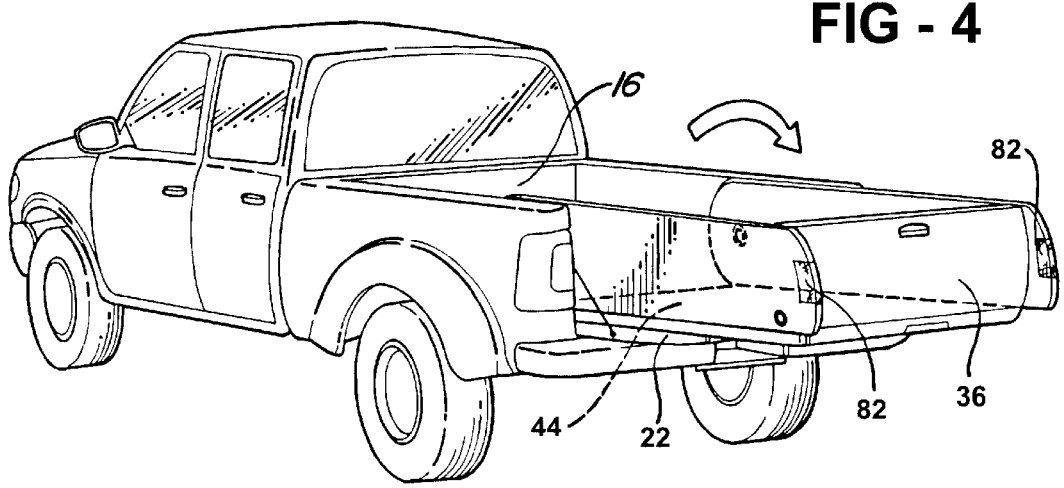

BED COVER AND EXTENDER UNIT FOR VEHICLES

TECHNICAL FIELD

This invention relates to the selective covering and lengthwise extension of the beds of vehicles such as trucks and more particularly to an articulated bed cover and extension frame unit that can be pivotally attached to the side walls of the bed of the vehicle and swung from a bed covering and stored position to a fully floored bed extension position.

BACKGROUND OF THE INVENTION

Engine powered utility vehicle such as pick-up trucks having forward cabs and rear beds are generally designed to conveniently and economically haul a wide range of cargo from bulky and heavy loads to small parcels. Protective covers are frequently added to such vehicles to enclose the beds thereof and protect the cargo. See U.S. Pat. No. 6,217,103 issued Apr. 17, 2001 to Schultz et al. for Hinged Tonneau Truck Bed Cover With Bed Divider, for example. Moreover, such trucks are often lightweight, highly maneuverable vehicles and are suitable for economical personal transportation. Larger loads are often handled by positioning the tailgate to a generally horizontal position aligned with and effectively extending the truck bed. Some cage-like, upright enclosures have been provided for the extending tailgate. For example, see U.S. Pat. No. 5,700,047 issued Dec. 23, 1977 to Leitner et al. for Truck Bed Extender. Moreover, with the progressively increasing use of such vehicles for personal transportation, cab designs evolved into larger and extended cabs for increased passenger space. Such larger cabs generally crowd into and limit the bed or cargo space. With such extended cabs and space limited beds, the need has grown for further increasing the bed space to accommodate more cargo including cargo previously carried by standard pick-up trucks including those with extensions. However, the prior tailgate and cage designs have not provided the extension that adequately meets new and higher standards and requirements for transport of increased amount of cargo or bulky cargo particularly where the existing beds are provided with a roof-like cover and substantial bed extensions are needed.

SUMMARY OF THE INVENTION

The present invention is drawn to a new and improved cover and extender unit for the beds of vehicles and particularly trucks of the pick-up type including those that have extended cabs for increased occupant seating. This invention provides the ability for vehicles with cargo beds to handle more cargo and bulky individual objects to meet new requirements and standards. In preferred embodiments of the present invention a bed cover and extender unit is provided as an accessory that can fit to a wide range of truck bed configurations and sizes to materially add to the utilitarian nature of truck type vehicles, particularly those with a forward cab and an aft bed having side walls and having a rear tailgate moveable between a closed box position and an extended position.

It is a feature, object and advantage of this invention to provide a new and improved on-board bed cover and extender unit for the bed of motor vehicles comprising a box-like frame construction having a solid top cover pivotally mounted thereto which is normally stowed within the confines of the vehicle bed and that is operatively mounted for limited pivoted movement between the stowed position and a bed extension position in which the cover converts to a bed extensions.

Another feature, object and advantage of this invention is to provide a new and improved substantially rigid cover and extender unit for the bed of a motor vehicle in which there is unique employment of the cover of the unit as the substantially linear extension of the vehicle bed. Moreover, in this invention the cover is automatically converted to a longitudinal extension of the bed by pivoting the unit from its normal stowed position in which the cover overlies the bed to an outboard position in which the cover extends rearwardly from the bed and the cover projects rearwardly from the aft end thereof.

Another feature object and advantage of this invention is to provide a new and improved cover and extender unit for the bed of a motor vehicle in which the unit has a solid cover that normally covers the bed of the vehicle and in which the unit can be displaced to provide a fully floored and walled extension of the bed and in which the displaced cover forms the floor of the bed extension.

These and another features, objects and advantages of this invention will become more apparent from the detailed description and from the following drawings.

BRIEF DESCRIPTION OF THE DRAWINGS

FIG. 1b is a cross section of a portion of the bed cover and the side wall of the vehicle bed illustrating a weather sealing arrangement;

FIG. 1c is another cross section of a portion of the bed cover and side wall of the vehicle bed illustrating another weather sealing arrangement;

FIG. 1d is a pictorial view of a portion of the bed cover and side of the extender showing the pivot connection therebetween;

FIG. 2 is an enlarged side view of the truck of FIG. 1 with parts broken away illustrating the bed cover and extension in a closed and stowed position;

FIG. 2a is a plan view of one of the brackets used for the pivotal mounting of the bed cover and extension unit to the truck of FIGS. 1 and 2;

FIG. 3 is a view similar to FIG. 2 but illustrating the bed cover and extension being turned from the covered and stowed position toward the extension position;

FIG. 4 is a view similar to FIG. 1 illustrating the bed cover and extension moved to the extension position;

DESCRIPTION OF THE PREFERRED EMBODIMENT

Figure 1:
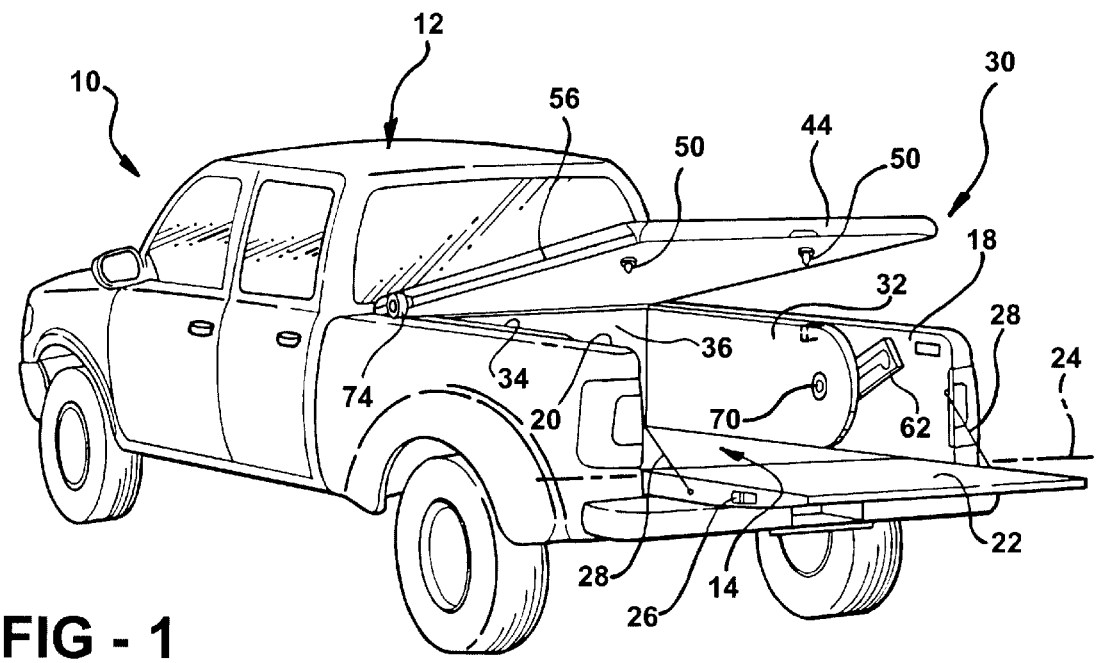
FIG. 1 is a pictoral view of a pick-up truck with a bed cover and bed extension unit installed in the truck bed in accordance with this invention.

Turning now in detail to the drawings there is shown in FIG. 1 a motorized vehicle 10 such as a pick-up truck that has an extended forward cab 12 accommodating the operator and passengers and a flat rear bed 14 for cargo transport. The bed 14 is bounded by upwardly rising forward end wall 16 (FIG. 2), laterally spaced right and left side walls 18, 20 extending rearwardly from connection with the forward end wall and a rear tailgate 22. The tailgate 22 is mounted for limited turning movement on the transverse pivot axis 24 of lower hinges between an upright, bed-closure position and a horizontal, bed-extending position. Conventional latches 26 are employed to releasably secure the tailgate 22 to the opposing sidewalls in the upright position to enclose the bed. Moreover, the horizontal position of the tailgate 22 is maintained by conventional mechanism such as a lever, chain or cable system 28.

Figure 1A:
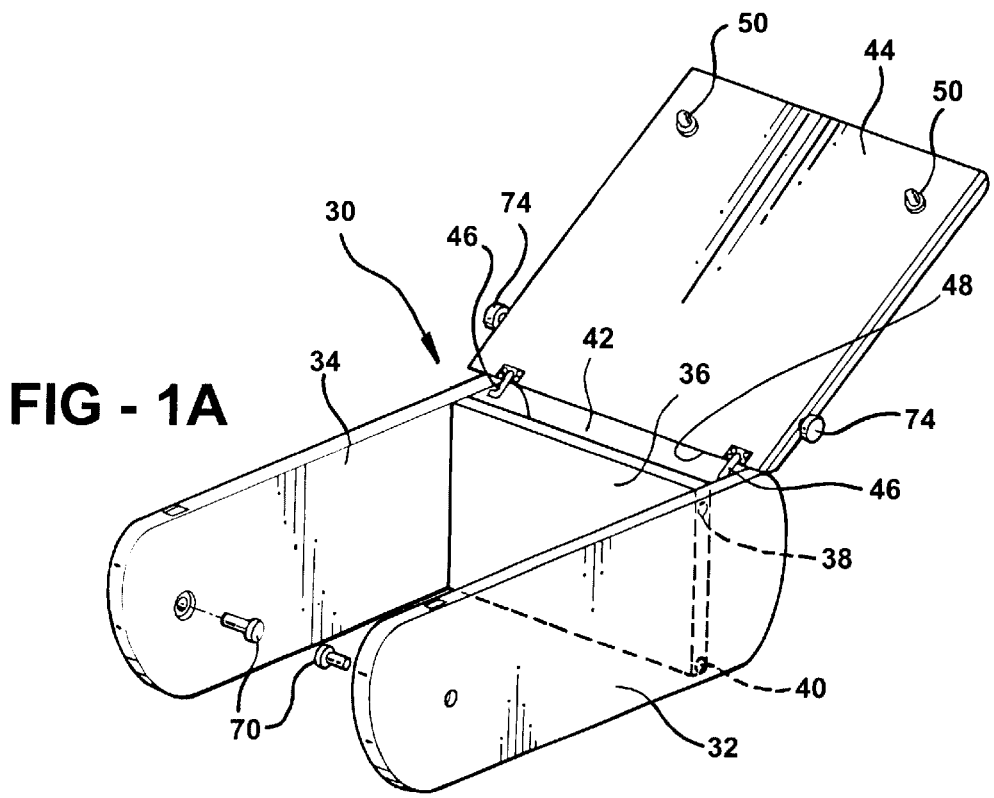
FIG. 1a is a pictoral view of the bed cover and extension unit of FIG. 1 with the cover swung to an open position.

As illustrated best in FIGS. 1, 1a and 2, a hard cover and extender unit 30 is provided for the bed 14 of the vehicle 10. The unit 30 is in the form of a pivoting frame comprising a pair of laterally spaced side members 32 and 34 whose forward ends are connected to one another by a forward transversely extending end gate 36. The end gate 36 is mounted by laterally extending pivots 38 to the side members 32 and 34 for swinging movement between an upright, unit-closed position and a horizontal extension position. A lower latch or detent 40 may be used to releasably hold the end gate 36 in the closed position of FIGS. 1, 1a and 2. The frame of unit 30 may be generally H-shaped and sized to operatively fit into the enclosed bed 14 of the vehicle. As shown the side members 32, 34 are parallel to one another and lie with clearance along the inner sides of the side walls 18, 20 of the truck bed. In the stowed position of the unit, the end gate 36 is forwardly positioned but lies in a rearwardly offset and parallel position with respect to the forward end wall 16 of the truck bed to provide a separate and accessibly forward compartment 42 in the truck bed.

The unit 30 further comprises an enlarged rectilinear and sturdy top cover 44 that is hinged by forward pivots 46 (see FIGS. 1a and 1d) to forward end portions of the side members. The pivots 46 extend from the forward edge portion 48 of the cover and extend transversely into bushings in the side members 32, 34 so that the cover can be upwardly swung on the pivots relative to the side members to provide access to the interior of the unit and thereby to the truck bed.

In the closed position the cover 44 preferably covers the entire bed of the vehicle and fits onto the upper surface of the side members 32, 34 and is releasably secured there to by suitable locks or latches 50. The lower surface of cover 44 when positioned on the side members generally aligns with the top flattened surfaces 52 of the sidewalls 18, 20 of the truck bed. Suitable weather sealing strips may be provided between the cover 44 and the side walls 18, 20 of the truck bed 14. Accordingly the cover 44 is operative to seal the truck bed 14 and any cargo carried thereon. In one example, an elongated flexible, sealing strip 56 of rubber or rubber-like material is operatively mounted to each side of the cover 44 by an elongated retainer 57 attached to or integral with the cover, see FIG. 1B. With the cover in the closed position, the sealing strip 56 sealingly contacts the top 52 of the side walls 18, 20 of the bed for weather sealing operation as diagrammatically illustrated. When the cover and extender unit 30 are swung to the extended position shown in FIG. 4, the sealing strip 56 will contact the surfaces of the side walls 18 and 20 and, being resilient, flex into the clearance 59 between the sides of the unit 10 and the side walls 18,20 where these parts are adjacent to one another.

An alternate seal is illustrated in FIG. 1C in which an elongated lip seal 56' is fixed by a bead 57' in a groove 58' in the side edges of the cover 44 and sealingly engages the top 52 of the side walls of the truck bed. When the unit is swung from the cover and stowed position to the bed extended position, portions of the seal 56' upon contacting the side walls will flex into the clearance 59' between the side of the cover side walls of the bed. Also suitable lip seals may be readily provided between the forward edge of the cover and the forward wall of the truck bed as well as between the cover and the tailgate to provide complete sealing of the bed as desired.

Pivot construction is provided so that the unit 30 may be readily swung between the covered and stowed position of FIG. 1 and the bed extending position of FIG. 4. In one example, opposing inclined brackets 62 are attached to the side walls of the bed by suitable fasteners such as threaded fasteners 63 as shown in FIG. 3. These brackets have inclined slots 64 provided therein which may pitch rearwardly and upwardly at a predetermined angle, such as forty-five degrees, from a home or storage position 66 to a raised unit turning position 68. Suitable pivots such as pivot pins 70 can be used to operatively connect the unit to the slotted brackets. These pivot pins may thread through the side members of the unit and may have ends that carry Nylon sliders 72 that ride in the tracks provided by the inclined slots 64.

The unit may be manually pulled rearwardly from the stowed position of FIG. 1 to initiate the extension of the truck bed. When so displaced, the inclined slots cam the rear of the unit upwardly until the pivot pins 70 seat in the upper turning position 68. Side rollers 74, FIG. 2, mounted to the bed cover adjacent the forward ends thereof operatively contact the top of the side walls 18 and 20 and roll as the unit is displaced rearwardly. These rollers reduce friction and thereby minimize the effort required to move the cover and extender unit to the raised turning position established by the ends of slots 64. After being moved to the turning position, the unit can be turned on the raised pivot in a rearward direction so that the cover clears the truck bed 14 as illustrated in FIG. 3. After clearing the truck bed, the unit can be moved forwardly in the truck bed with the sliding pivots 70 riding downwardly in the inclined slots until the cover contacts the truck bed and the upper surface of the lowered tailgate as shown in FIG. 4.

In this position, the unit is in the bed extended position with the end gate 36 now serving as a tailgate for the extended bed. The end gate 36 can be turned on pivot 38 to open the extended bed. After receiving the load the end gate is turned to the closed position and latched. Preferably, rear lights 82 are provided on the aft end of the sides of the unit or in other suitable locations.

Figure 5A:
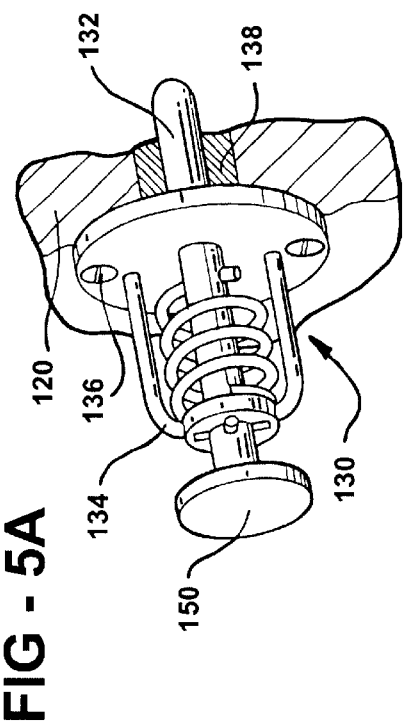
FIG. 5A is a pictorial view of a pivot mounting unit mounting the cover and extension unit to the truck of FIG. 5.
Figure 5:
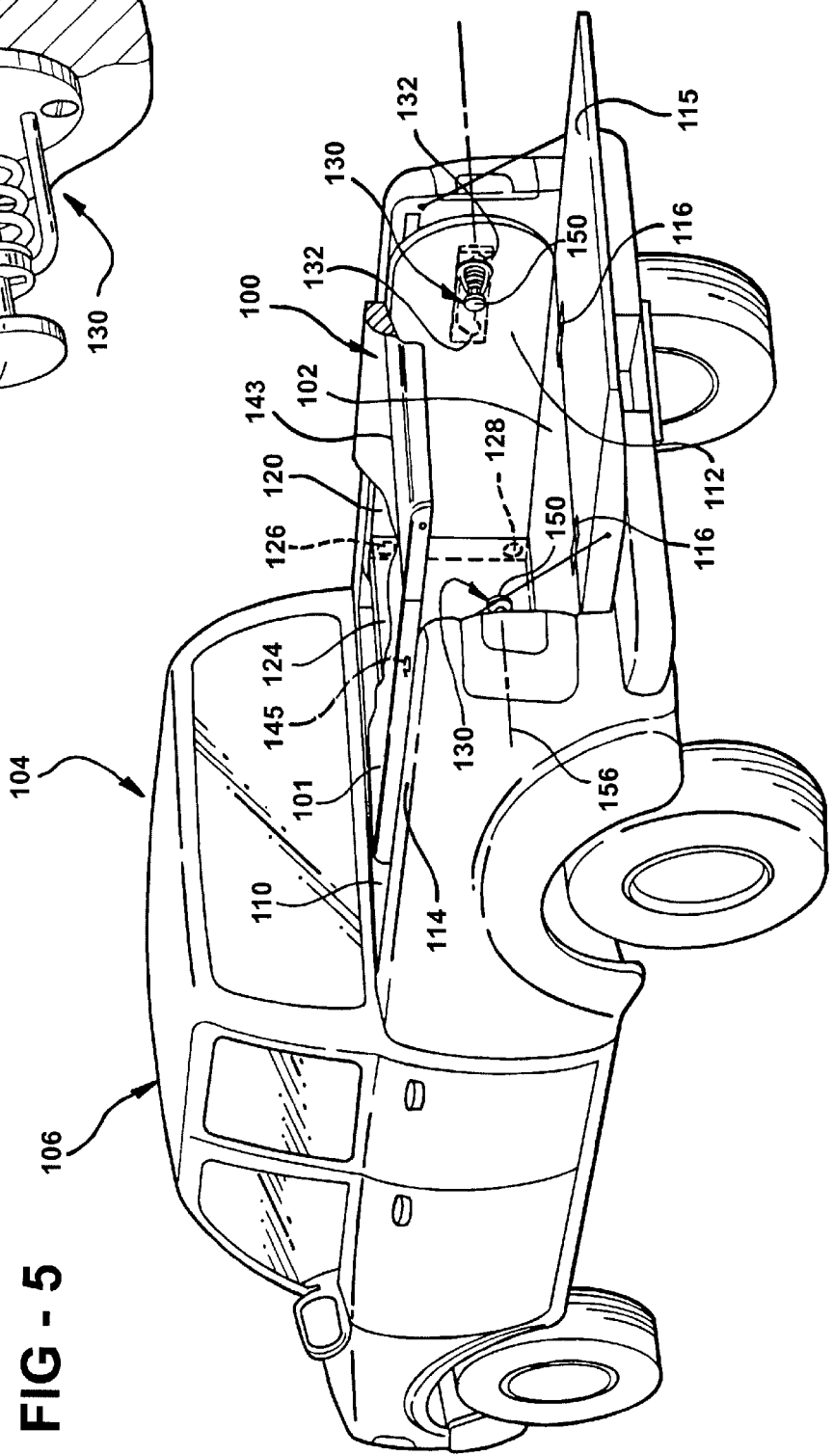
FIG. 5 is a pictoral view of a pick-up truck with a bed cover and extension unit depicting another preferred embodiment of the invention.
Figure 6:
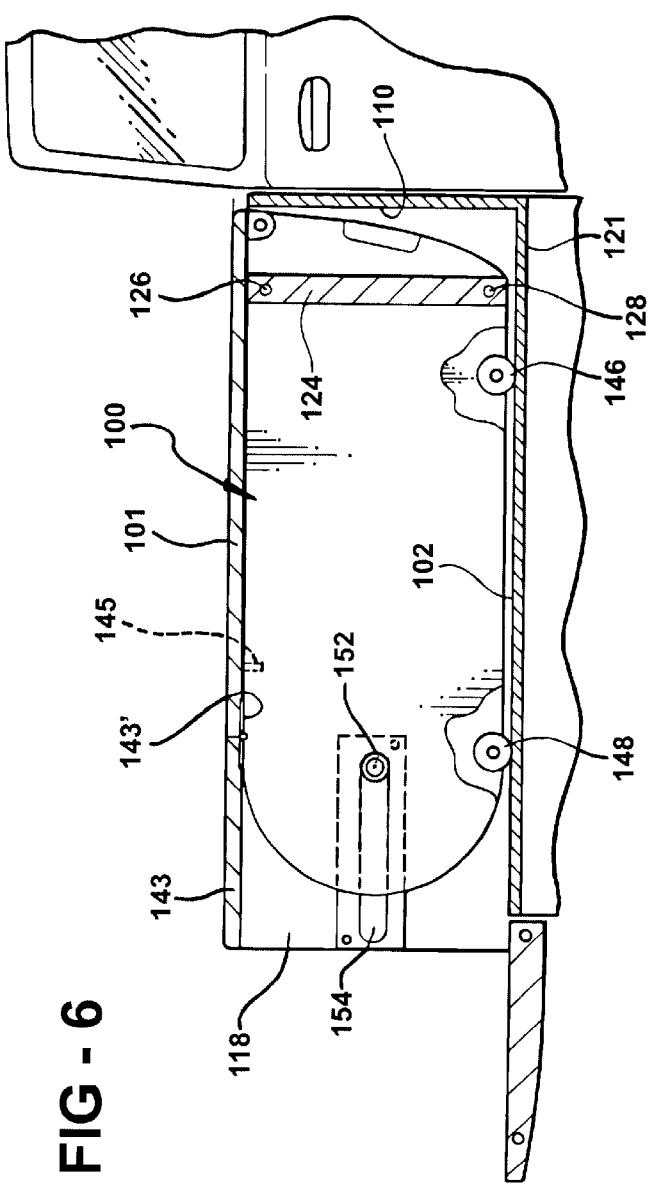
FIG. 6 is a side view of a portion of the bed of the truck of FIG. 5 with the cover and extension unit aboard.

The embodiment of FIGS. 5 and 6 is drawn to a bed cover and extension unit 100 that is similar in construction to that of the embodiment of FIGS. 1–4. More particularly the unit 100 has a solid cover 101 as previously described. The unit can be readily installed on the rear flattened bed 102 of automotive vehicle 104 having a forward cab 106 for the operator and passengers. As illustrated, the vehicle bed 102 is compassed by a forward wall 110, laterally spaced side walls 112 and 114 and a rear tailgate 115 mounted by hinges 116 for pivotal movement between an upstanding bed closing position and a horizontal bed extending position.

As in the previous embodiment, the unit 100 has a pair of laterally spaced sides 118, 120, which in the stowed and bed covering position, lie adjacent to the side walls of the vehicle. The unit further has a forward closure panel 124 extending between and pivoted to the forward ends of the sides by laterally extending pivots 126 that mount the panel for selective swinging movement from the closed vertical position to an open horizontal position, later described. Normally this closure panel is maintained in the closed position by conventional locking devices or latches 128.

Figure 7:
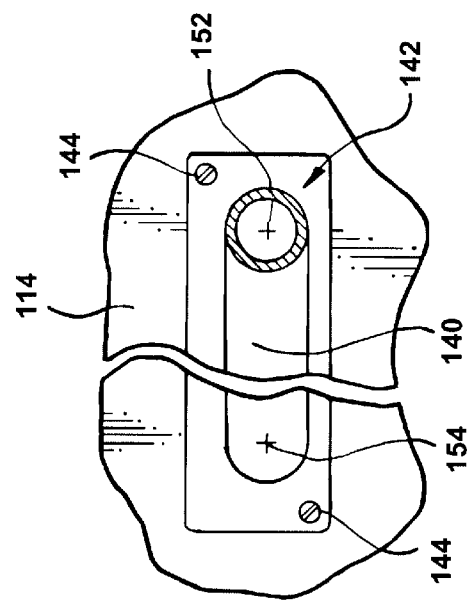
FIG. 7 is an enlarged view of a portion of FIG. 6 illustrating details of the bracket and sliding pivot construction of the bed cover and extension unit of FIGS. 5 and 6.

Moreover, the unit 100 can be pivotally joined to the sidewalls of the bed by a pair of laterally spaced pivot components 130 operatively mounted to opposing sides 118 and 120 near the aft ends thereof as shown in FIGS. 5 and 5a. These pivot components have spring biased pivot pins 132 operatively mounted in housings 134 that are secured to opposing interior wall surfaces of the sides 118 and 120 of the unit 100 adjacent the rear ends thereof by threaded fasteners 136. The pivot pins 132 can be released from upper catches of their housings so that they extend from through transverse cylindrical pivot bushings 138 provided in the sides of the unit and extend therefrom into operative reception in the horizontally extending slots 140 formed in horizontal side brackets 142 as shown in FIG. 7. These brackets are aligned with one another and are attached directly opposite to one another on the side walls 112, 114 of the bed by fasteners 144. As in the construction of FIGS. 1–4, the cover 101 is pivoted at its forward end to the sides 118 and 120 of the unit 100 so that it can be swung open to provide convenient access to the interior of the bed. The cover may be formed with a rectilinear rear panel 143 that is pivotally mounted thereto by hinges 143' so that it may be swung to an out-of-way or stored position for clearance purposes when the unit is swung to the extension position. Suitable side detents or latches are provided to secure the panel 143 in the extended position as well as in the stored position as needed. Rear locks or latches 145 are also provided to releasably secure the cover 101 to the sides of the unit 100. Forward and aft wheels 146 and 148 are provided for opposite sides of the unit that contact the bed 102 to reduce friction and reduce the physical effort needed to move the unit in the bed.

In operation, the unit 100 may be readily loaded into the bed of the vehicle from the aft end with the tailgate 115 open. The pivot pins 132 of opposing pivots 130 when appropriately aligned with the slots 140 in the matching respective brackets 142 can be released by turning the outer manual knob 150 of each of the pivots so that their springs force the pivot pins to enter the bracket slots 140. The unit can be manually displaced forwardly until the pivot pins engage the forward terminal ends or storage stations 152 of the slots. The tail gate is then closed with the unit in a stowed position having the bed fully roofed by cover 101.

If the bed extension is desired, the tail gate is then opened and horizontally extended and the unit 100 is simply pulled rearward with this effort reduced by operation of the wheels 146, 148. The pivot pins will move from the forward stations 152 and ride in the horizontal tracks provided by slots 140 in the side brackets until the rearward terminal ends or turning stations 154 of the slots are reached. This establishes the pivot axis 156 on which the unit 100 can be turned 180 degrees from the stowed position to establish the bed extension as in the previous embodiment. The unit 100 can be displaced forwardly until the pivot pins again enter the forward stations 152 to foreshorten the extension if desired.

Moreover, as in the previous embodiment the extension is fully floored and completely walled to contain loads carried by the vehicle. From the extended position with pivot pins in their turning stations 154, the unit can be readily returned to the stowed position by simply turning the unit forwardly on the pivot axis one hundred eighty degrees in which the bed is shortened and again covered by the hard cover.

While the pivots have been provided on the unit and the slotted brackets secured to the side walls of the vehicle bed, pivot pins may be attached to the side walls of the bed and brackets secured to the wall of the cover and extension unit to provide for unit adjustment and pivoting if desired. Moreover, with respect to the above description, it will be appreciated that the optimal dimensional relationships for the parts of this invention including variation in sizes, clearances, materials, shapes, forms and functions and the manner of operation to suit various constructions will now be readily apparent to those skilled in the art. Accordingly, all such constructions are within the scope of the invention set forth in the following claims.

What is claimed is:

1. In combination with an automotive vehicle having a forward cab for vehicle occupants and a rearward flattened bed for vehicle cargo, a pair of laterally-spaced side walls extending rearwardly from said cab on opposite sides of the bed and further having a generally rectangular rear tailgate having upper and lower edges pivotally mounted with respect to said side walls for selective movement between substantially horizontal and vertical fixed positions relative to said side walls and said bed for respectively horizontally extending and vertically gating the bed, a vehicle bed cover and extender unit for protectively covering said bed and for extending said bed rearwardly beyond the extent of said tailgate when said tailgate is in said substantially horizontal position, said unit having a pair of laterally spaced and elongated sides with forward and trailing ends extending along the side walls of said bed, a transversely extending and pivotally mounted gating wall connecting said sides to one another adjacent to the forward ends thereof, a generally rectangular overhead cover for the unit having forward and trailing edges covering at least one portion of the bed, said trailing edge of said cover being generally aligned with the upper edge of said tailgate for operatively closing said bed, forward pivot construction adjacent to the forward edge of said overhead cover defining a first transverse axis for pivotally mounting said cover to said sides at points adjacent to the forward ends thereof so that said trailing end of said cover can be manually gripped and said cover turned from the rear of said vehicle in a swinging movement on the first transverse axis between a closed position overlying said sides of the unit to cover said bed and an open position away from said sides of said unit whereby the area between the sides and said bed is accessible, rearward pivot construction defining a second transverse axis for pivotally mounting the sides of the unit to the side walls of said bed of the vehicle so that said unit can be turned on the second transverse axis to a bed extending position in which the cover overlaps and is directly supported by a portion of said bed and by said tailgate when said tailgate is in said horizontal and bed extending position to thereby further extend said bed of the vehicle and in which said pivotally mounted gating wall serves as an operable tailgate for the extended bed.

2. The unit of claim 1, wherein said rearward pivot construction is defined by second pivots extending transversely from said sides of said unit, and wherein said side walls of said vehicle on said sides of said bed have elongated and opposing slots associated therewith for slidably receiving the second pivots to allow said unit to be moved from a first position in which the second pivots are disposed in a storage station in said slots and said cover overlies said bed to a second position in which said second pivots are moved to a turning station in said slots that permit said unit to be subsequently moved to a position in which the cargo bed is extended by said rigid cover.

3. The unit of claim 2, wherein said slots are linear and generally parallel to the bed and wherein said slots receive the second pivot to allow said unit to be linearly moved from a first position to a second position aft of the first position and to be subsequently turned on said second pivots and said second transverse axis to a third position to thereby extend said bed.

4. The unit of claim 2, wherein said slots are disposed at a rearwardly extending and upwardly inclined angle so that said second pivots can be moved upwardly and rearwardly to establish said second transverse axis for the unit that allow the unit to be turned about said second axis to a third position so that said cover directly overlies a portion of the bed and said tailgate when in said horizontal position and increases the extent of said bed.

5. The unit of claim 1, wherein the bed of the vehicle has a forward end wall adjacent to the cab and wherein said gating wall of said unit is a generally rectangular closure panel that is pivotally mounted to the laterally spaced sides of said unit by pivots that extend laterally from upper corner portions of the gating wall so that when said unit has been turned to the bed extended position said gating wall can be utilized as an endmost tailgate to open and close said extended bed.

6. In combination with an automotive vehicle having a flattened bed for vehicle cargo and an occupant cab immediately forward of the bed and a pair of laterally spaced side walls extending rearwardly from said cab on opposite sides of said bed and further having a pivotally mounted tailgate selectively and independently movable between fixed horizontal and upright positions relative to said side walls and said bed for respectively extending and gating the bed, a frame unit for covering said bed and for extending said bed when said tailgate is in said horizontal position, said frame unit comprising: a pair of laterally spaced sides and a forward end wall connecting the sides to one another adjacent to forward ends thereof, a generally firm and rectangular cover for the frame unit for covering said bed, forward pivot construction for pivotally mounting said cover to the frame unit adjacent to the forward ends of said sides for swinging movement on a transverse axis between a closed position overlying the sides of the unit so that said bed is roofed and an open position away from said sides so that the area between said sides and said bed is accessible from said tailgate, and a second pivot for pivotally mounting the frame unit to the side walls of the bed of the vehicle so that said frame unit can be turned on said second pivot to a bed extending position in which the cover is in a substantially horizontal position and directly contacts and overlies at least a portion of said bed and further directly contacts and extends beyond said tailgate when said tailgate is in said horizontal position to thereby extend the bed of the vehicle.

7. The frame unit of claim 6, wherein said side walls defining said bed have opposing and inclined slots associated therewith, and wherein said second pivot is defined by transversely extending pivot pins slidably received in said slots to secure and pivotally mount the frame unit to the side walls.

8. The frame unit of claim 6, wherein said cover contacts part of an upper surface of said flat bed and all upper surfaces of said tailgate when said unit has been pivoted to a bed extended position.

9. The frame unit of claim 6, wherein said cover is provided with resilient weather seals extending outwardly from the periphery of said cover for direct contact with upper surfaces of said side walls to operatively seal said bed when said cover is covering said bed.

10. In combination, an automotive vehicle having a flattened cargo bed with an occupant cab immediately forward of the bed and having a pair of side walls extending rearwardly from said cab on opposite sides of the bed and further having a pivotally mounted tailgate selectively and independently movable between fixed substantially horizontal and upright positions relative to said side walls, a bed cover and bed extension unit for protectively covering and for the lengthwise extension of said bed, said unit having a pair of elongated sides having forward and trailing ends that extend along the side walls of said bed, an end gating wall connecting said sides to one another adjacent to the forward ends, pivot elements for pivotally connecting said end gating wall to said sides for movement between bed-gating upright and bed-extending horizontal positions relative to said side walls, a rigid cover for the unit providing an overhead covering for at least one portion of the bed, forward pivot construction defining a first transverse axis for pivotally mounting the cover to the sides adjacent to the forward ends thereof for swinging movement on the first transverse axis between a closed position overlying the sides of the unit and roofing said bed and an open position away from said sides whereby the area between the sides and said bed is accessible, and rearward pivot construction defining a second transverse axis for pivotally mounting the sides of the unit to the side walls of the bed of the vehicle so that said unit can be turned on the second transverse axis to a bed extending position in which the cover overlaps and directly contacts and is supported by the upper surface of said bed and by the upper surface of said tailgate when in said horizontal position thereby operationally extending said bed of the vehicle.

* * * * *